(12) United States Patent
Umetani

(10) Patent No.: US 7,080,659 B2
(45) Date of Patent: Jul. 25, 2006

(54) DAMPER VALVE AND HYDRAULIC POWER STEERING APPARATUS USING THE SAME

(75) Inventor: Akihisa Umetani, Nara (JP)

(73) Assignee: Koyo Seiko Co., Ltd., Osaka (JP)

(*) Notice: Subject to any disclaimer, the term of this patent is extended or adjusted under 35 U.S.C. 154(b) by 219 days.

(21) Appl. No.: 10/662,297

(22) Filed: Sep. 16, 2003

(65) Prior Publication Data

US 2004/0050426 A1  Mar. 18, 2004

(30) Foreign Application Priority Data

Sep. 17, 2002  (JP)  .................. P. 2002-270166
Sep. 17, 2002  (JP)  .................. P. 2002-270167

(51) Int. Cl.
*F16K 17/196* (2006.01)
*F16F 9/348* (2006.01)

(52) U.S. Cl. .................. 137/493.8; 137/493; 188/282.1

(58) Field of Classification Search .................. 137/493, 137/493.8; 188/282.1, 282.5
See application file for complete search history.

(56) References Cited

U.S. PATENT DOCUMENTS 5,868,161 A * 2/1999 Asbrand et al. .......... 137/498

6,393,962 B1 * 5/2002 Hamano et al. .............. 91/447
6,543,473 B1 * 4/2003 Miyazaki ..................... 137/493

FOREIGN PATENT DOCUMENTS

| EP | 1 075 998 A1 | 2/2001 |
| EP | 1 184 257 B1 | 4/2004 |
| JP | 2001-158369 | 6/2001 |

OTHER PUBLICATIONS

German Office Action dated Dec. 8, 2005 with an English translation.

* cited by examiner

*Primary Examiner*—Stephen M. Hepperle
(74) *Attorney, Agent, or Firm*—McGinn IP Law Group, PLLC

(57) ABSTRACT

A damper valve includes a valve member for covering openings of communicating passages of a valve sleeve. The valve member is elastically deformed by a low flow rate of the hydraulic oil flowing from a second chamber to a first chamber of the valve sleeve and when a flow rate of the hydraulic oil flowing from the second chamber to the first chamber exceeds a predetermined value, the valve member is moved with the spool against urging force of a spring to widely open the openings of the communicating passages.

21 Claims, 11 Drawing Sheets

DAMPER VALVE AND HYDRAULIC POWER STEERING APPARATUS USING THE SAME

BACKGROUND OF THE INVENTION

The present invention relates to a damper valve mounted on a vehicle and provided between a hydraulic pump and a hydraulic actuator, and a hydraulic power steering apparatus using the damper valve.

Generally, a hydraulic power steering apparatus which assists steering power by oil pressure is commonly used as a steering apparatus for a vehicle. The hydraulic power steering apparatus supplies hydraulic oil discharged from a hydraulic pump to a hydraulic actuator such as a hydraulic cylinder and a hydraulic motor to provide steering assist power. A hydraulic control valve for controlling supply of the hydraulic oil to the hydraulic actuator according to a steering direction and a steering resistance is interposed between the hydraulic pump and the hydraulic actuator.

In the hydraulic power steering apparatus of this kind, such a phenomenon that steered wheels excessively vibrate due to parts precision of the steering system and the vibration transfers to the steering wheel through, for example, a piston rod (rack rod), or a so-called shimmy phenomenon may occur. To suppress such a shimmy phenomenon, such a measurement is employed that a one-way valve is provided inside the hydraulic control valve to seal the hydraulic cylinder and the hydraulic cylinder functions as a damper against the vibration.

However, in the case that the hydraulic cylinder functions as the damper described above, especially when the sharp turn is made to avoid danger, flow of the hydraulic oil to be returned to the hydraulic control valve from one of oil chambers is stopped by the one-way valve, and the steering assist power is lowered so that the problem occurs in that the heavy load applied to the steering wheel. To avoid this, damper valves are provided for respective hydraulic circuits connecting the hydraulic control valve and left and right oil chambers, respectively.

Such a damper valve is disclosed in JP-A-2001-158369, and as shown in FIG. 14, a valve sleeve 102 is disposed within a hollow casing 101, and the interior of the casing 101 is partitioned by the valve sleeve 102 into a first chamber 103 and a second chamber 104. The first chamber 103 communicates to a hydraulic control valve side through a first port 105 and the second chamber 104 communicates to a hydraulic cylinder side through a second port 106.

Such a damper valve is disclosed in JP-A-2001-158369, and as shown in FIG. 9, a valve sleeve 102 is disposed within a hollow casing 101, and the interior of the casing 101 is partitioned by the valve sleeve 102 into a first chamber 103 and a second chamber 104. The first chamber 103 communicates to a hydraulic control valve side through a first port 105 and the second chamber 104 communicates to a hydraulic cylinder side through a second port 106.

Inside the valve sleeve 102, an one-way valve 107 for allowing the hydraulic oil to flow from the first port 105 to the second port 106 and restrict the hydraulic oil from flowing in the reverse direction is provided. A plurality of passage 109 for communicating the first chamber 103 to the second chamber 104 are formed through a peripheral wall portion of the valve sleeve 102. A spool 110 capable of separating from an end surface of the valve sleeve 102 is provided at the first chamber 103, and is urged toward the end surface of the valve sleeve 102 by a spring 111. A valve member 112 for closing the passage 109 is provided between the spool 110 and the valve sleeve 102, The valve member 112 is annular shape and made of thin metal plate, and is capable of being elastically deformed by pressure of the hydraulic oil flowing to the hydraulic control valve side through the passage 109 and the first chamber 103.

With the structure of the damper valve, if the piston rod of the hydraulic cylinder vibrates right and left due to the vibration of the steered wheels, the valve member 112 is elastically deformed in response to the vibration by pressure of the hydraulic oil to flow to the first chamber 103 from the second chamber 104 through the passage 109. Thereby, The passage 109 is opened and the hydraulic oil flows and be returned to the hydraulic control valve side through the first chamber 103 and the first port 105. At this time, since the passage 109 is narrowed by the valve member 112, the damper effect is applied and the vibration from the steered wheels is suppressed from transferring to the steering wheel through the piston rod of the hydraulic cylinder.

When a driver makes the sharp turn, since a large quantity of hydraulic oil is returned to the hydraulic control valve side from the oil chamber of one of left and right hydraulic cylinder, the valve member 112 is elastically deformed in large amount and is widely separated with the spool 110 from the valve sleeve 102 against the urging force of the spring 111. Therefore, the passage is widely opened and the large quantity of the hydraulic oil is returned to the hydraulic control valve side. As a result, the problem in which a heavy load applied to the steering wheel can be prevented.

Incidentally, in the damper valve of this kind, if the valve member 112 is stuck to the valve sleeve 102 due to oil shortage, the driver feels a certain load at the steering until the valve member 112 is separated from the valve sleeve 102 and it may influence the steering feeling. Thus, a plurality of recess portions 113 are formed on a contact surface of the valve sleeve 102 with the valve member 112 and prevent the valve member 112 from the hard sticking to the contact surface.

In the above conventional hydraulic power steering apparatus, in the case the amount of the hydraulic oil returned from the hydraulic cylinder to the hydraulic control valve is a small amount and the pressure is under a predetermined pressure, the valve member 112 is not deformed and the passage 109 is closed, and at the time that the flow rate of the hydraulic oil increases and the pressure exceeds the predetermined pressure, the valve 112 is elastically deformed and the passage 109 is opened. Due to this action, the load variation occurs at the time of the valve member 112 being opened, and the driver feels ON/OFF feeling and it may gives bad influence to the steering feeling.

SUMMARY OF THE INVENTION

In view of the above problems, an object of the invention is to provide a damper valve capable of obtaining a good steering feeling, and a hydraulic power steering apparatus using the damper valve.

In order to solve the above object, an exemplary embodiment of the present invention provides a damper valve that includes a hollow casing, a valve sleeve, a spool, a spring, a supply passage, a one-way valve, a reflex passage and a valve member. The hollow casing includes a first port connected to a hydraulic pump side and a second port connected to a hydraulic actuator side. The valve sleeve divides the casing into a first chamber communicating with the first port and a second chamber communicating with the second port and includes a plurality of communicating passages communicating with the first chamber and the second chamber. The spool is axially moveable with respect to the valve sleeve in the first chamber. The spring urges the spool toward the second chamber. The supply port supplies hydraulic oil to the first chamber through the first port to the second chamber through the spool and the valve sleeve. The one-way valve is provided in the supply port and allows the hydraulic oil to flow from the first port to the second port and inhibits the hydraulic oil from flowing from the second port to the first port. The reflux passage leads the hydraulic oil from the second chamber to the first chamber through the communicating passages. The valve member covers the openings of the plurality of communicating passages which face the first chamber. The valve member is elastically deformed by a low flow rate of the hydraulic oil flowing from the second chamber to the first chamber and when a flow rate of the hydraulic oil flowing from the second chamber to the first chamber exceeds a predetermined value, the valve member is moved with the spool against the urging force of the spring to widely open the openings of the communicating passages.

In another exemplary embodiment of the present invention, the valve member is an annular member surrounding the spool, and an inner circumference of the annular member is held between the valve sleeve and the spool.

In yet another exemplary embodiment of the present invention, a gap is formed between an outer circumference portion of the valve member and the openings of the communicating passages.

In a further exemplary embodiment of the present invention, an annular projection, to which the valve member is abutted, is formed at an end surface of the valve sleeve to form the gap.

In yet another exemplary embodiment of the present invention, the valve further includes a shim interposed between the valve member and an end surface of the valve sleeve to form the gap.

In another exemplary embodiment of the present invention, the valve member includes a step portion to form the gap.

In a further exemplary embodiment of the present invention, an end surface of the valve sleeve, which faces the valve member, is formed with an annular groove communicating with the openings of the communicating passages.

In yet a further exemplary embodiment of the present invention, a gap is formed between an outer circumference of the valve member and a bottom surface of the annular groove.

In another exemplary embodiment of the present invention, an outer circumference portion of the valve member contacts the valve sleeve to close the openings of the plurality of communicating passages.

In yet another exemplary embodiment of the present invention, the damper valve is provided in a predetermined hydraulic circuit disposed between an output port of the hydraulic control valve and the hydraulic actuator.

DETAILED DESCRIPTION OF PREFERRED EMBODIMENTS

Now, description will be given in detail of the preferred embodiment according to the invention with reference to the accompanying drawings.

First Embodiment

Figure 1:
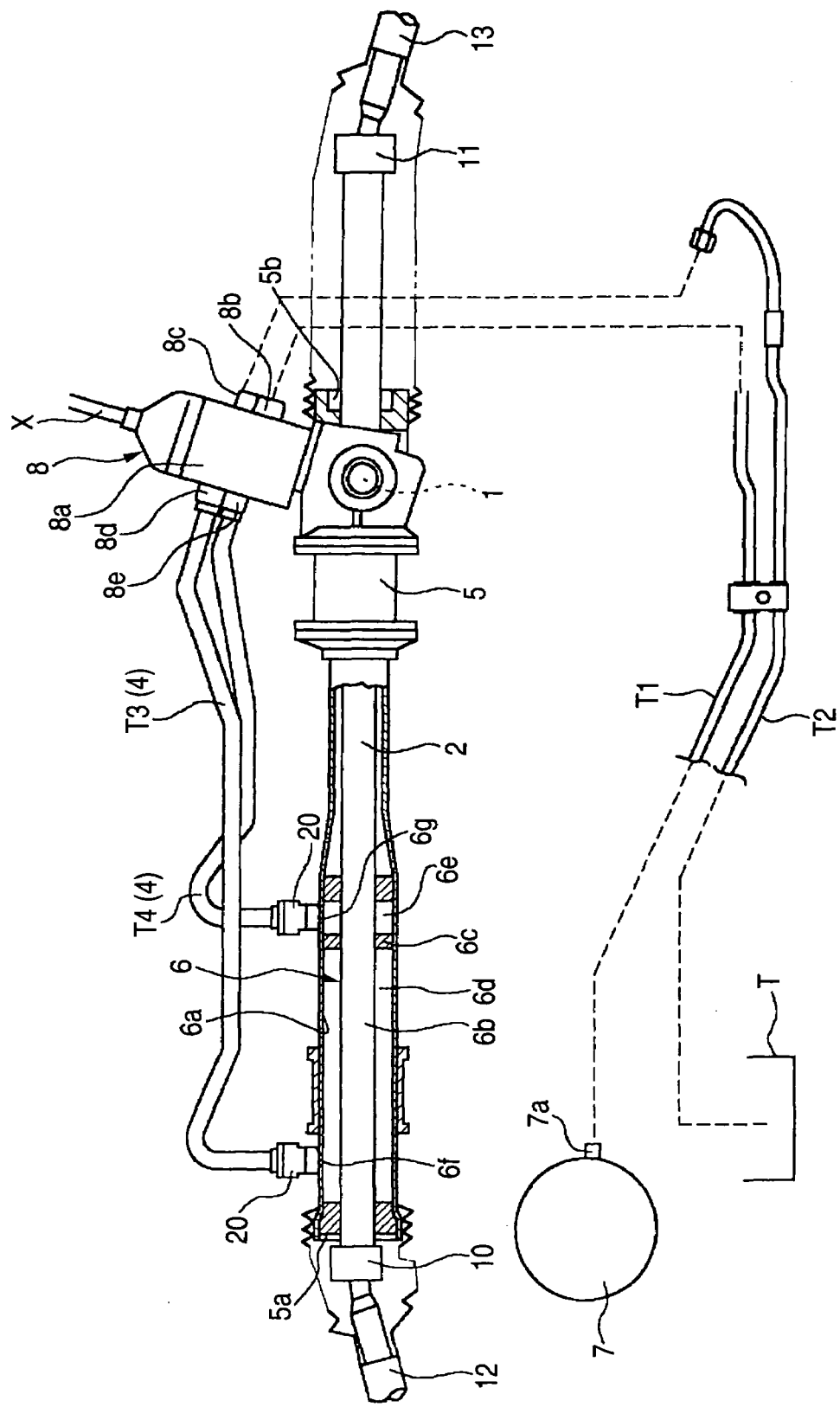
FIG. 1 is a schematic diagram showing a hydraulic power steering apparatus according to the invention.

FIG. 1 is a schematic diagram showing a hydraulic power steering apparatus according to a first embodiment of the invention. The steering apparatus mainly includes an input shaft X connected to a not-shown steering wheel (handle); a pinion 1 rotated in accordance with the rotation of the input shaft X; a rack shaft 2 meshed with the pinion 1; a housing 5 covering the rack shaft 2; a hydraulic cylinder 6 serving as an hydraulic actuator provided inside the housing 5; a hydraulic pump 7 for supplying hydraulic oil to the cylinder 6; and a hydraulic control valve 8 for controlling supply and discharge of the oil for the cylinder 6 in accordance with the operation of the steering wheel.

Opposite ends of the rack shaft 2 project from opposite openings 5a, 5b of the housing 5, and are integrally formed with the ball joints 10, 11, respectively. Tie rods 12, 13 are attached to the respective ball joints 10, 11. The opposite ends of the rack shaft 2 are connected to steered wheels through the tie rods 12, 13, respectively. Therefore, the pinion 1 is rotated by the rotation operation of the steering wheel through the input shaft X, and the rack shaft 2 is moved in a axial direction (vehicle width direction) thereby conducting the steering of the vehicle.

The hydraulic cylinder 6 includes a cylinder tube 6a constituted by the housing 5, a piston rod 6b constituted by the rack shaft 2 and a piston 6c integral with the rack shaft 2. A opposite-sides areas sandwiching the piston 6c constitute a first oil chamber 6d and a second oil chamber 6e, respectively.

The hydraulic control valve 8 is constituted by a rotary valve, and includes a valve housing 8a from which a input port 8b, a return port 8c, a first output port 8d and a second output port 8e project. The input port 8b is connected to the output port 7a of the hydraulic pump 7 through a first hydraulic pipe T1. The return port 8c is connected to a reserve tank T through a second hydraulic pipe T2. The first output port 8d is connected to the first oil chamber 6d of the cylinder 6 through a third hydraulic pipe T3. The second output port Be is connected to the second oil chamber 6e of the cylinder 6 through a fourth hydraulic pipe T4.1 The hydraulic control valve 8 supplies the hydraulic oil for steering assist to one of the oil chambers 6d, 6e and simultaneously discharging the hydraulic oil from the other oil chamber to the reserve tank T.

The third and fourth hydraulic pipe T3, T4 are formed of metal pipes 4, and are connected to the cylinder 6 through the damper valve 20 according to the first embodiment of the invention. That is, the third hydraulic pipe T3 is connected a first input port 6f communicating with the first oil chamber 6d of the cylinder 6 through the damper valve 20, and the fourth hydraulic pipe T4 is connected to a second input port 6g communicating with the second oil chamber 6e of the cylinder 6 through the damper valve 20.

Each damper valve 20 has a function of a check valve allowing the hydraulic oil to flow from the hydraulic control valve 8 to the hydraulic cylinder 6 and a function of a narrow check valve allowing the hydraulic oil to flow in the reverse direction with applying a predetermined resistance.

Figure 2:
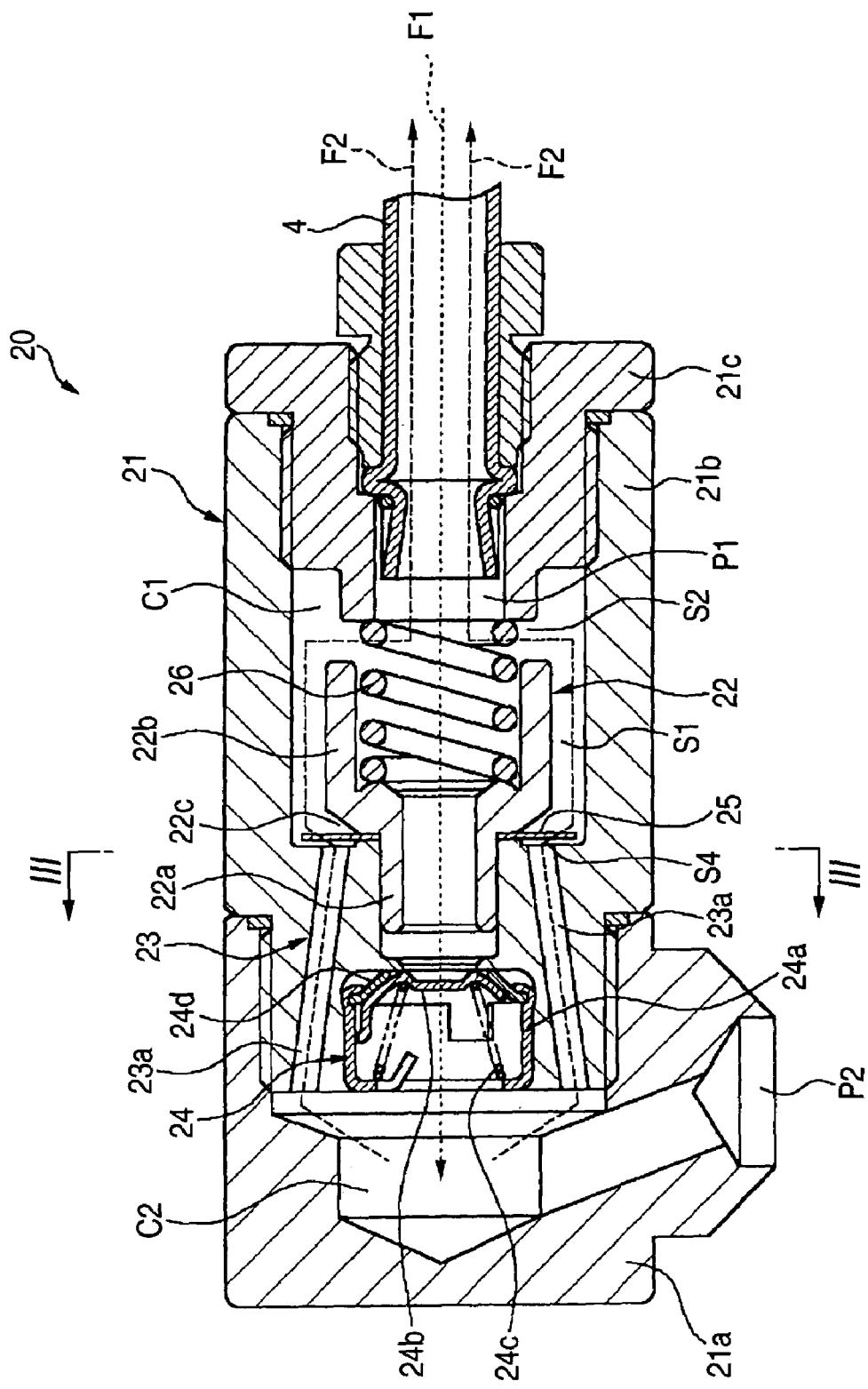
FIG. 2 is a sectional view showing a damper valve according to a first embodiment of the invention

As shown in FIG. 2, the damper valve 20 includes: a cylindrical spool disposed inside the casing 21; a valve sleeve 23 for partitioning the inside of the casing 21; a one-way valve 24 provided in side the valve sleeve 23; a valve member 25 disposed along one end surface of the valve sleeve 23; and a coil compression spring 26 for urging the spool 22.

The casing 21 is constituted by: a flare pipe 21a; a first connector 21b connected to the flare pipe 21a; a second connector 21c distal end of which is fitted into the casing 21. The interior of the casing 21 is divided into a first chamber C1 communicating with the hydraulic control valve 8 and a second chamber C2 communicating with the hydraulic cylinder 6 by the valve sleeve 23.

A first port P1 is formed through the second connector 21C for communicating the first chamber c1 to the hydraulic control valve 8 through the metal pipe 4. A second port P2 is formed through the flare pipe 21a for communicating the second chamber C2 to the first hydraulic chamber 6d (or the second hydraulic chamber 6e) of the hydraulic cylinder 6. The peripheral portion of the second port P2 is welded to the cylinder tube 6a of the hydraulic cylinder 6.

The spool 22 includes a step constituted by a small-diameter portion 22a and a large diameter portion 22b inner and outer diameters of which are larger than that of the small-diameter portion 22a, respectively. The small-diameter portion 22a is fitted into the valve sleeve 23 at the first chamber side C1 so as to be slidable in the axial direction. A predetermined gap S1 is provided between the outer circumference of the large-diameter portion 22b and the internal circumference of the first chamber C1 and a gap S2 for allowing the hydraulic oil to flow is provided between the right end surface of the large-diameter portion 22b and the left end surface of the second connector 21c in FIG. 2. The compression spring 26 is loaded inside the large-diameter portion 22b.

Figure 3:
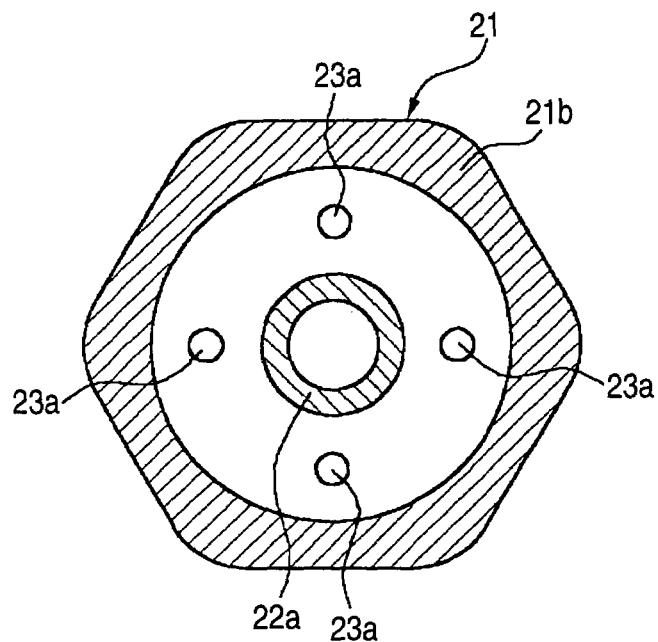
FIG. 3 is a sectional view taken along the line 3—3 of FIG. 2.

The valve sleeve 23 is continuously formed at the one end portion of the first connector 21b and communicating passages 23a one ends of which are opened to the first chamber C1 and the other ends of which are opened to the second chamber C2 are formed at the peripheral wall of the valve sleeve 23. The plurality of the communicating passages 23a are arranged in a circular form as shown in FIG. 3.

Interiors of the valve sleeve 23 and the spool 22 constitute a oil supply passage F1 for supplying, to the second chamber C2, the hydraulic oil supplied from the hydraulic control valve 8 through the first port P1. The gap S1 between the spool 22 and the first chamber C1 and the gap S2 between the spool 22 and the second connector 21c constitute a reflux passage F2 guiding, to the first port P1, the hydraulic oil to be returned from the second chamber C2 to the first chamber C1.

The one-way valve 24 includes: a cylindrical case 24a provided inside the value sleeve 23; a movable valve member 24b arranged inside the case 24a; a coil spring 24c for urging the movable valve member 24b, which is housed in the case 24a; and a ring valve sheet member 24d on which the movable valve member 24b sits, attached to the case 24a. These component members are assembled and unitized to form the one-way valve 24 fixed and fitted into the valve sleeve 23.

The movable valve member 24b is movably arranged along the oil passage and normally closely contacts with the valve sheet member 24d by the urging force of the compression spring 24, thereby closing an opening formed at a central portion of the valve sheet member 24d Accordingly, the one-way valve 24 close the interior of the sleeve 23 and prevents the hydraulic oil from flowing from the hydraulic cylinder 6 to the hydraulic control valve 8. The movable valve member 24b is separated from the valve sheet member 24d against the urging force of the coil spring 24c due to pressure of hydraulic oil to flow from the hydraulic control valve 8 to the hydraulic cylinder 6. Thereby, the inside of the valve sleeve 23 is opened and the hydraulic oil is successively passes the first port P1, the supply passage F1 and the second port P2. As a result, the hydraulic oil from the hydraulic control valve 8 is supplied to the chamber corresponding to a steering direction of the operated steering wheel, thereby assisting the rotation operation of the steering wheel.

Figure 4:
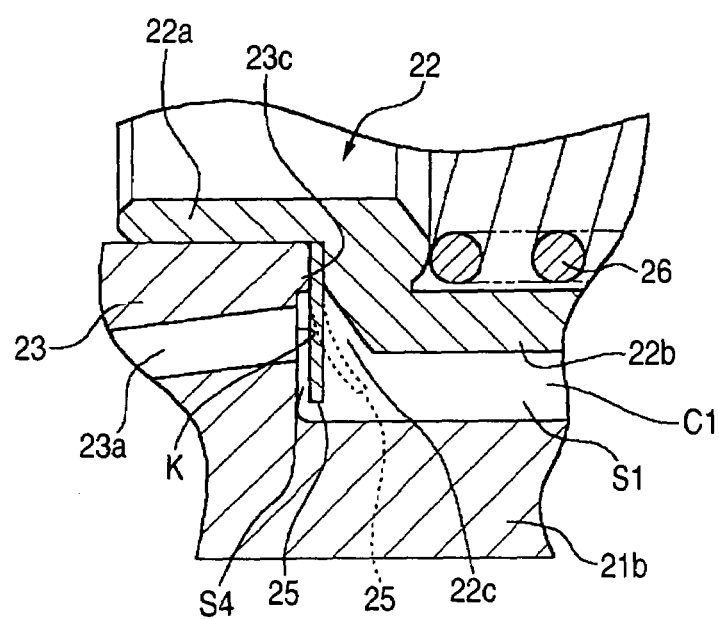
FIG. 4 is a sectional enlarged view of a primary portion of FIG. 2.

As shown in FIG. 4, the valve member 25 is constituted by a flat annular member made of metal plate. A gap S4 is provided between one surface of the valve member 25 and a surface of the valve sleeve 23 facing the first chamber C1. A inner peripheral of the valve member 25 is fitted to the outer peripheral of the small-diameter portion 22a of the spool 22. A downstream side opening K of the communicating passage 23a is covered with a predetermined area of the valve member 25 at the outer circumference side. A thickness of the valve member 25 is set so that the outer circumference side of the valve member 25 can be elastically deformed by the small amount of the hydraulic oil returned through the communicating passage 23a. The amount of the elastic deformation varies according to the flow rate of the hydraulic oil. Therefore, the valve member 25 can delicately open and close the communicating passage 23a according to the amount of the flow rate of the hydraulic oil.

The gap S4 between the valve member 25 and the valve sleeve 23 can be formed by providing an annular projection 23c at the end surface of the valve sleeve 23. Since the gap S4 is formed for normally opening the communicating passage 23a, even if the amount of hydraulic oil returned through the communicating passage 23a is small and the valve member 25 cannot be deformed, the hydraulic oil can flows to the first chamber C1. The gap 34 is set so that the hydraulic oil flows to the first chamber with a certain flowing resistance before elastic deformation on the valve member 25 starting (for example, 0.01–0.015 mm in thickness).

Incidentally, the valve sleeve 23 is provided with an annular recess portion 22c for allowing elastic deformation on the valve member 25.

The compression spring 26 urges the spool 22 toward the second chamber C2 with a certain pressure, and the left end surface of the large-diameter portion 22b of the spool 22 is abutted against the surface of the valve sleeve 23 facing the first chamber C1. The compression spring 26 is interposed between the spool 22 and the second connector 21a in a compressed condition so as to be expanded and constricted in accordance with the flow rate of the hydraulic oil to be returned from the hydraulic cylinder 6 to the hydraulic control valve 8. The urging force of the compression spring 26 is set so that the valve member 25 is separated from the valve sleeve 23 with the valve sleeve 23 at the time when the amount of elastic deformation of the valve member 25 exceeds a certain amount, i.e., the flow rate of the hydraulic oil to be return shifts from a low flow rate region to a high flow rate region.

With the damper valve 20 having the above structure, when the piston rod 6b of the hydraulic cylinder 6 vibrates in right and left due to the slight vibration of the steered wheels, a small amount or a low flow rate of the hydraulic oil from the hydraulic cylinder 6 flows and is returned to the hydraulic control valve 8 through the second port P2 and the reflux passage F2. At this time, if the valve member 25 is not deformed since the amount of the returned hydraulic oil is small, the hydraulic oil flows and is returned through the gap S4 between the valve sleeve 23 and the valve member 25. When the flow rate of the returned hydraulic oil increases and shifts to the high flow rate region, the hydraulic oil can flow and be returned by elastically deforming the valve member 25. The reflux passage F2 is narrowed by the valve member 25 in either regions, i.e. in low flow rate region or in high flow rate region, thereby realizing the damper effect. Accordingly, The vibration from the steered wheels is suppressed from transferring to the steering wheel through the piston rod 6b of the hydraulic cylinder 6. As mentioned above, in even when the flow rate of the returned hydraulic oil is in such a small amount region that the elastic deformation on the valve member 25 does not occur, the hydraulic oil can flow and be returned while realizing the damper effect. Therefore, ON/OFF feeling which the driver feels when the valve member 25 is elastically deformed can be suppressed, and thereby obtaining a good steering characteristic.

Figure 5:
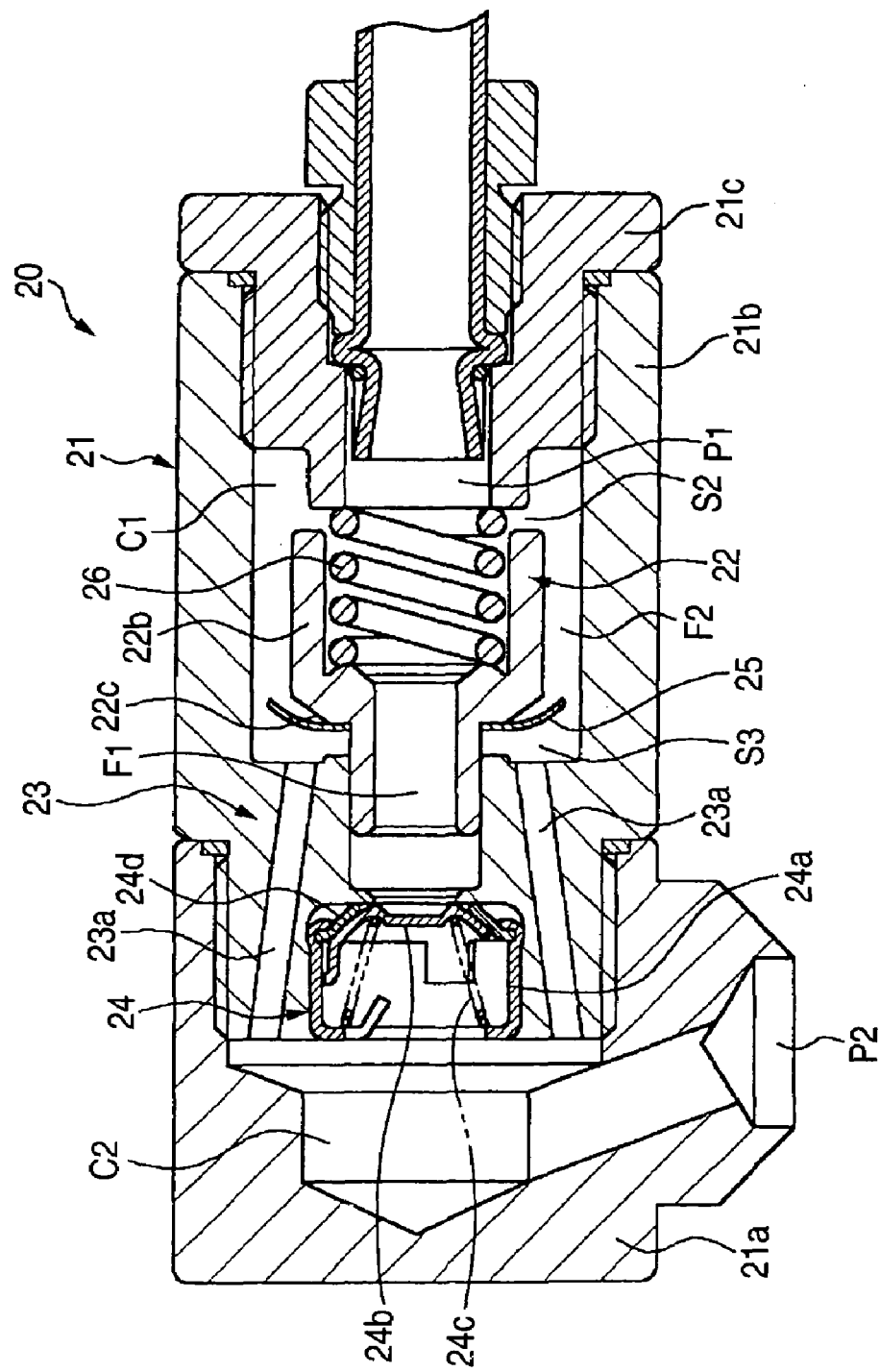
FIG. 5 is a sectional view showing an operation of the damper valve

On the other hand, in the case that the hydraulic oil to be returned to the hydraulic control valve 8 is in the high flow rate region, for example, when the driver makes a sharp turn by rotating the steering wheel, the valve member 25 is separated from the valve sleeve 23 with the spool 22 and a large gap is formed therebetween at the time of a predetermined amount of the elastic deformation of the valve member 25 (see FIG. 5). Thereby, the hydraulic oil from the hydraulic cylinder 6 is returned smoothly to the hydraulic control valve 8 through the second port P2 and the reflux passage F2. As a result, steering assist force can be prevented from deteriorating and the problem such as a heavy load being applied to the steering wheel can be prevented.

In the case of the flowing hydraulic oil being in high flow rate region, since the valve member 25 is widely elastically deformed and is widely separated from the valve sleeve 23 with the spool 22, a large pressure difference between the left and right end surfaces of the valve sleeve 23 is prevented from occurring. Therefore, good following characteristic for a sharp turn can be secured.

By virtue of the gap S4 between the valve sleeve 23 and the valve member 25, oil shortage due to a close contact of the valve member 25 and the valve sleeve 23 can be prevented from occurring between the valve member 25 and the valve sleeve 23, thereby preventing a phenomenon that the valve member 25 closely contacts with the valve sleeve 23 and is resistant to separated from the valve sleeve 23, that is, sticking phenomenon, from occurring. Therefore, the communicating passage 23a can surely opened in response to a flow rate of the hydraulic oil to be returned.

Modification

Figure 6:
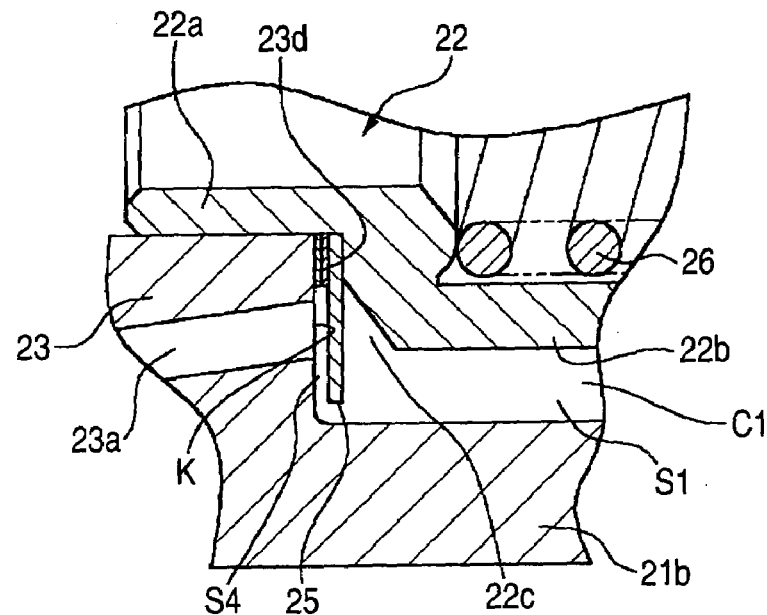
FIG. 6 is a sectional view showing a primary portion according to a modification of the first embodiment of the invention.
Figure 7:
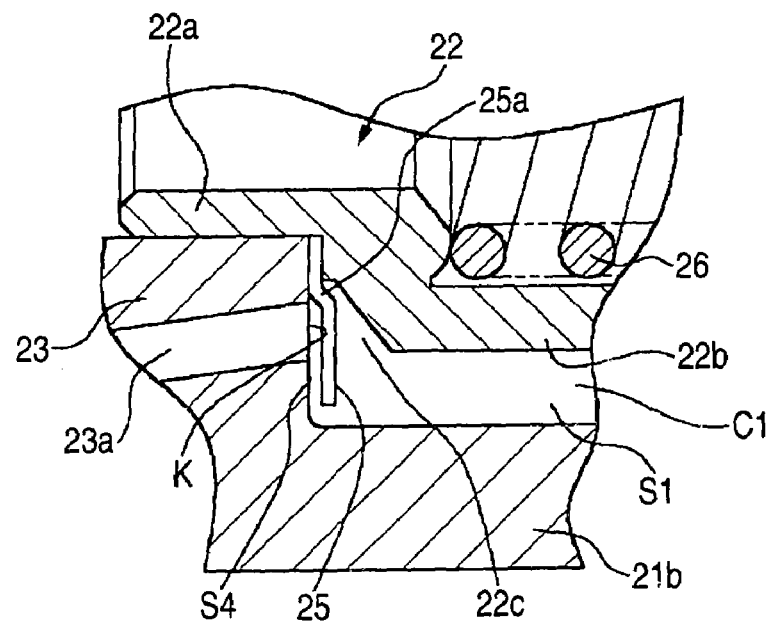
FIG. 7 is a sectional view showing a primary portion according to a modification of the first embodiment of the invention.
Figure 8:
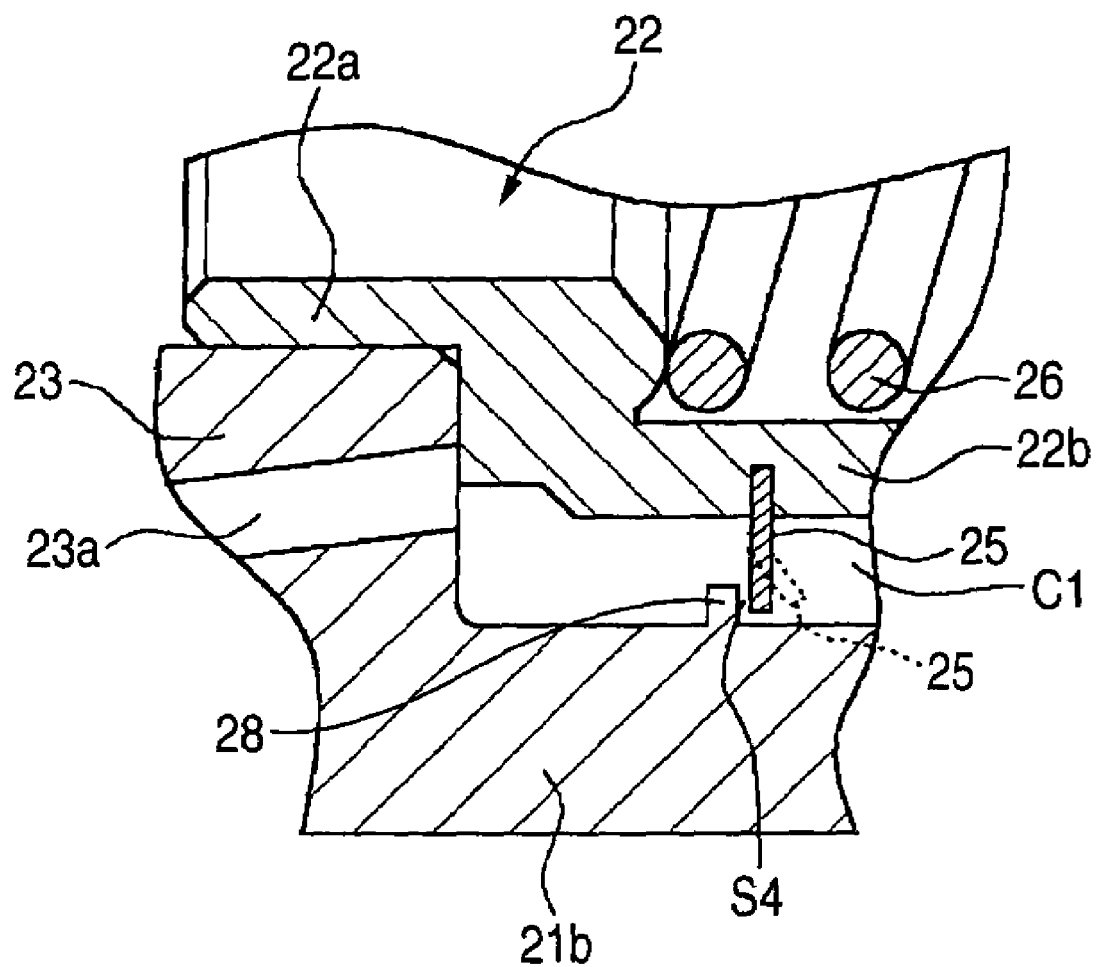
FIG. 8 is a sectional view showing a primary portion according to a modification of the first embodiment of the invention.

FIGS. 6 to 8 show modifications of the first embodiment according to the invention, respectively.

In the first embodiment, the gaps S4 between the valve sleeve 23 and the valve member 25 is formed by providing the projection 23c at the valve sleeve 23. However, instead of the projection 23c, a shim 23d may be interposed therebetween as shown in FIG. 6, and the valve member 25 itself may be formed with a step portion 25a as show in FIG. 7 in order to form the gap S4.

Further, as shown in FIG. 8, the valve member 25 may be disposed midway along the large-diameter portion 22b of the spool 22 and an annular projecting portion 28 may be formed around an inner circumference of the casing 21, so that the valve member 25 at the outer side faces to the projecting portion 28 with forming a gap S4 therebetween.

The damper valve 20 should be disposed at least at a position of any one of any hydraulic circuits between the output port 8d, 8e of the hydraulic control valve 8 and the hydraulic cylinder 6, such as interior of the first output port 8d and the second output port 8e of the hydraulic control valve 8.

Second Embodiment

Now, a second embodiment according to the present invention will be described in detail with reference to FIGS. 9 to 12.

Figure 9:
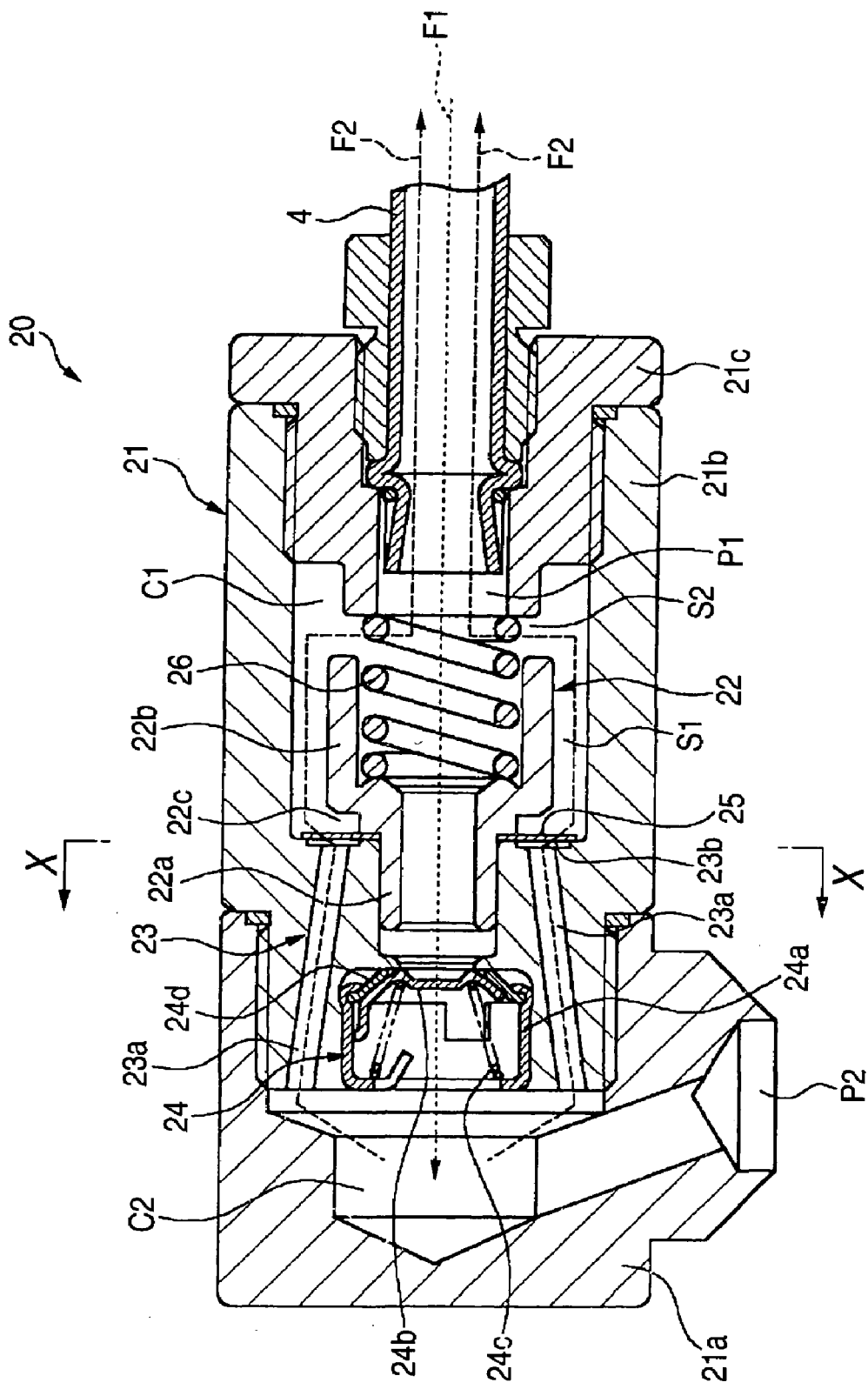
FIG. 9 is a sectional view showing a damper valve according to a second embodiment of the invention.
Figure 10:
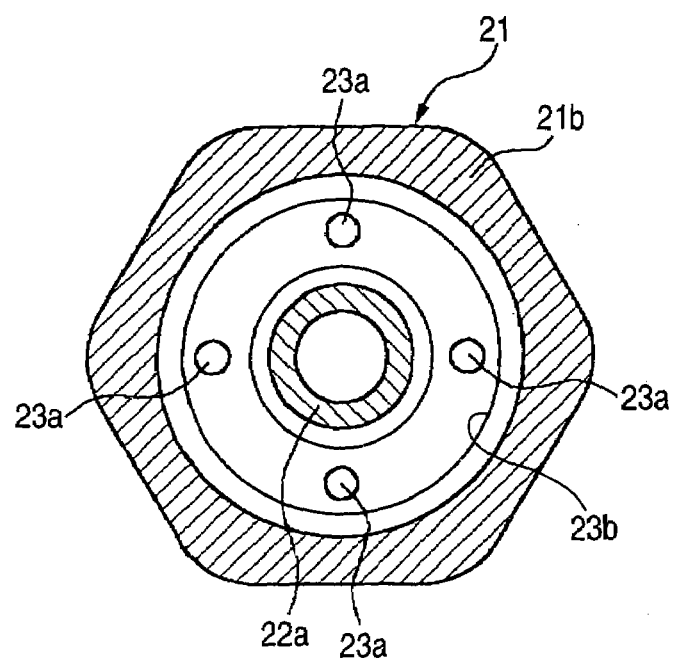
FIG. 10 is a sectional view taken along the line 10—10 of FIG. 9.
Figure 11:
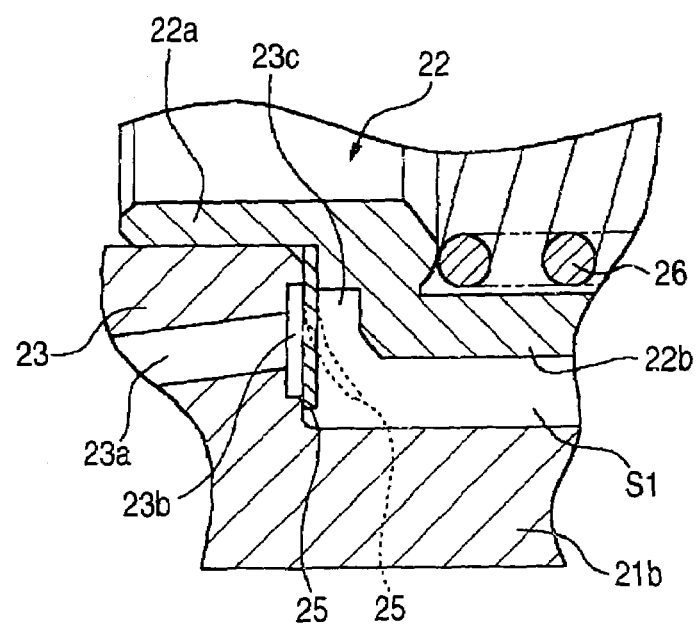
FIG. 11 is a sectional enlarged view of a primary portion of FIG. 9.
Figure 12:
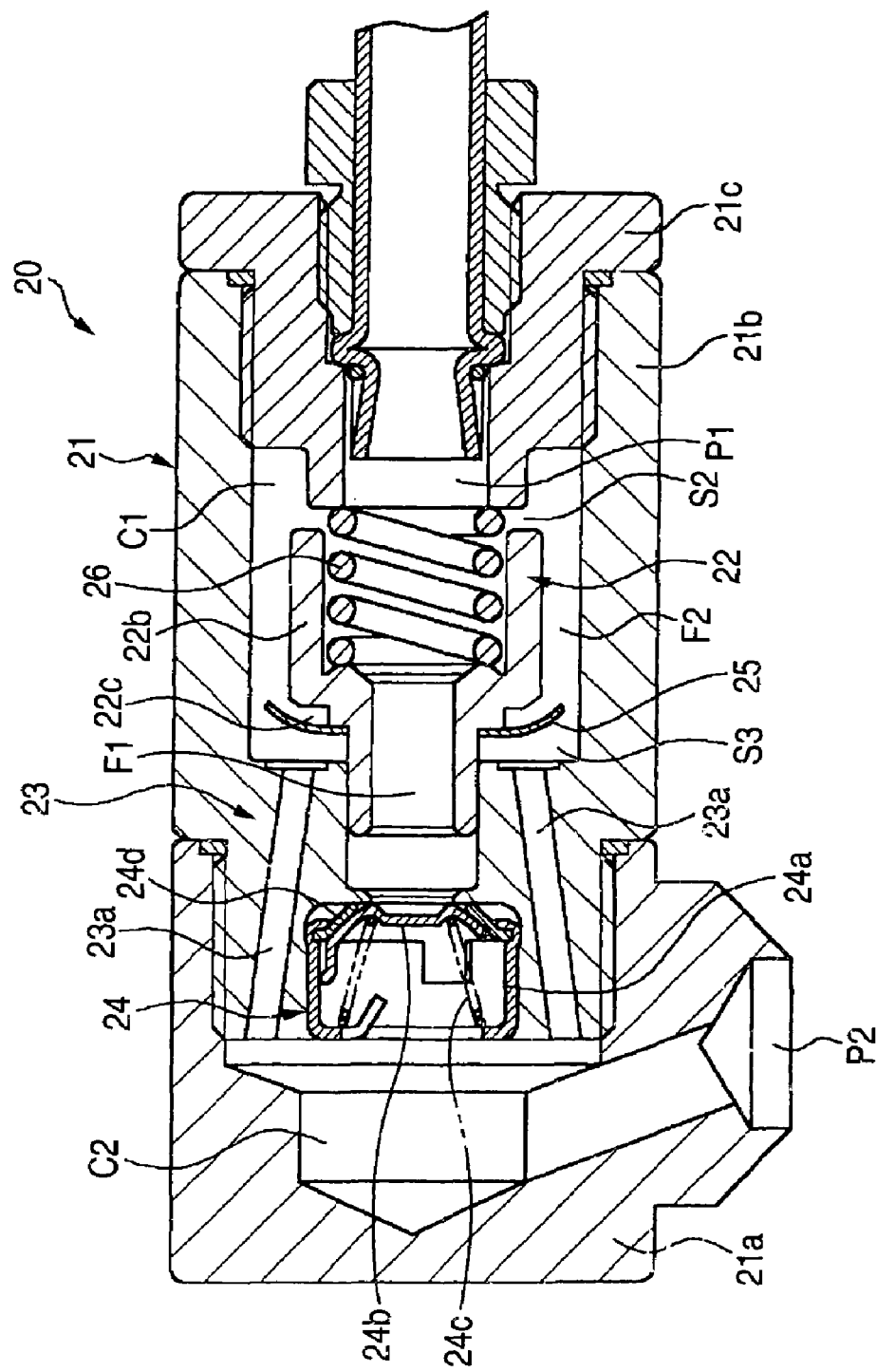
FIG. 12 is a sectional view showing an operation of the damper valve according to the second embodiment.

FIG. 9 is a sectional view showing a damper valve according to a second embodiment of the invention; FIG. 10 is a sectional view taken along the line 10—10 of FIG. 9; FIG. 11 is a sectional enlarged view of a primary portion of FIG. 9; and FIG. 12 is a sectional view showing an operation of the damper valve according to the second embodiment.

Those constituent portions, basically identical to those of the first embodiment, will be designated by identical reference numerals, respectively, and detailed description thereof will be omitted As shown in FIG. 10, an annular groove 23b communicating with the respective communicating passages 23a is formed on an end surface facing to the first chamber C1 of the valve sleeve 23. The annular groove 23b is coaxial with the valve member 25 in a state the annular groove 23b is opposed to one end surface of the valve member 25, and ends of the communicating passage 23a at the down stream side opens to the bottom portion of the annular groove 23b. A groove width of the annular groove 23b is set larger than an opening width (diameter of the opening) of the communicating passage 23a, and a whole of the groove 23b is covered with the valve member 25.

AS shown in FIG. 11, the valve member 25 is formed of a flat annular member made of a thin metal plate and an inner circumference of the valve member 25 is fitted to an outer circumference of the small-diameter portion 22a of the spool 22. The annular groove 23b is covered with a predetermined are of the valve member 25 at the outer side. A thickness of the valve member 25 is set so that the outer circumference thereof can be elastically deformed by low-rate hydraulic oil to be returned through the communicating passage 23a. An amount of the elastic deformation varies in accordance with a flow rate of the hydraulic oil. Thereby, the communicating passage 23a can be delicately opened and closed in accordance with the flow rate of the hydraulic oil.

Incidentally, a recess portion 22c for allowing the valve member 25 to be elastically deformed is formed at the valve sleeve 23.

With the damper valve 20 having the above structure according to the second embodiment, when the piston rod 6b of the hydraulic cylinder 6 vibrates in right and left due to the light vibration of the steered wheels, a small amount of the hydraulic oil from the hydraulic cylinder 6 flows and is returned to the second port P2 and the reflux passage F2, and the valve member 25 is elastically deformed in accordance with the flow rate, and the hydraulic oil flows and is returned to the hydraulic control valve 8 through the first chamber C1 and the first port P1. At this time, since the reflux passage F2 is narrowed by the valve member 25, a damper effect is realized and the vibration from the steered wheels is prevented from transferring to the steering wheel through the piston rod 6b of the hydraulic cylinder 6. The opening amount of the communicating passage 23a is automatically adjusted in response to a flow rate of the hydraulic oil and thereby obtaining a good steering characteristic. Furthermore, the hydraulic oil at the communicating passage 23a is led to the annular groove 23b and hydraulic oil shortage is prevented from occurring over the whole circumference of the surface of the valve member 24, thereby preventing a phenomenon that the valve member 25 closely contacts with the valve sleeve 23 and is resistant to separated from the valve sleeve 23, that is, sticking phenomenon, from occurring. Since the hydraulic oil can act on the whole circumference of the valve member 25 to press it, an operation of the valve member 25 can be stabilized as compared with a related art in which the valve member is partially pressed by the hydraulic oil. Especially, the groove width of the annular groove 23b is set wider than the opening width of the communicating passage 23a and a contact area between the valve member 25 and the hydraulic oil is set large, thereby preventing the sticking phenomenon from occurring more effectively. As a result, a good steering characteristic can be obtained.

On the other hand, in the case that the hydraulic oil to be returned to the hydraulic control valve 8 is in the high flow rate region, for example, when the driver makes a sharp turn by rotating the steering wheel, the valve member 25 is separated from the valve sleeve 23 with the spool 22 and a large gap is formed therebetween at the time of a predetermined amount of the elastic deformation of the valve member 25 (see FIG. 5). Thereby, the hydraulic oil from the hydraulic cylinder 6 is returned smoothly to the hydraulic control valve 8 through the second port P2 and the reflux passage F2. As a result, steering assist force can be prevented from deteriorating and the problem such as a heavy load being applied to the steering wheel can be prevented.

In the case of the flowing hydraulic oil being in high flow rate region, since the valve member 25 is widely elastically deformed and is widely separated from the valve sleeve 23 with the spool 22, a large pressure difference between the left and right end surfaces of the valve sleeve 23 is prevented from occurring. Therefore, good following characteristic for a sharp turn can be secured.

Modification

Figure 13:
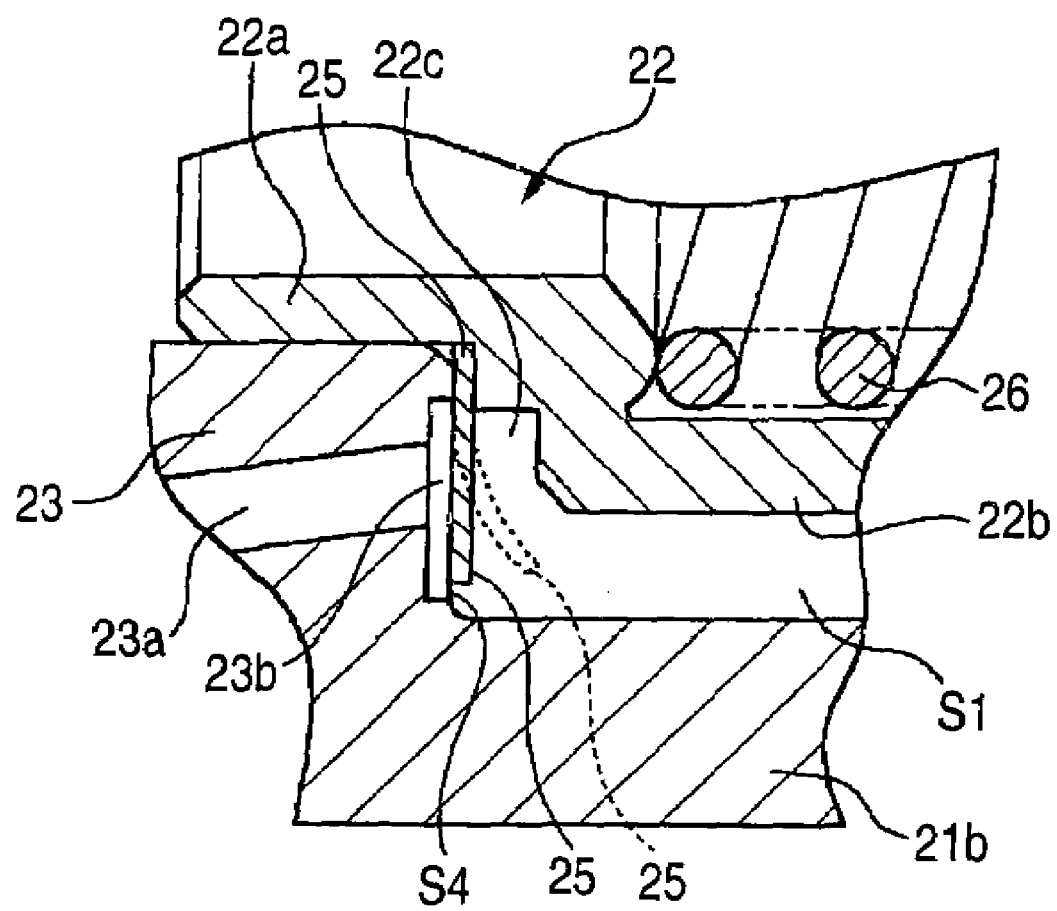
FIG. 13 is a modification of the second embodiment of the invention.
Figure 14:
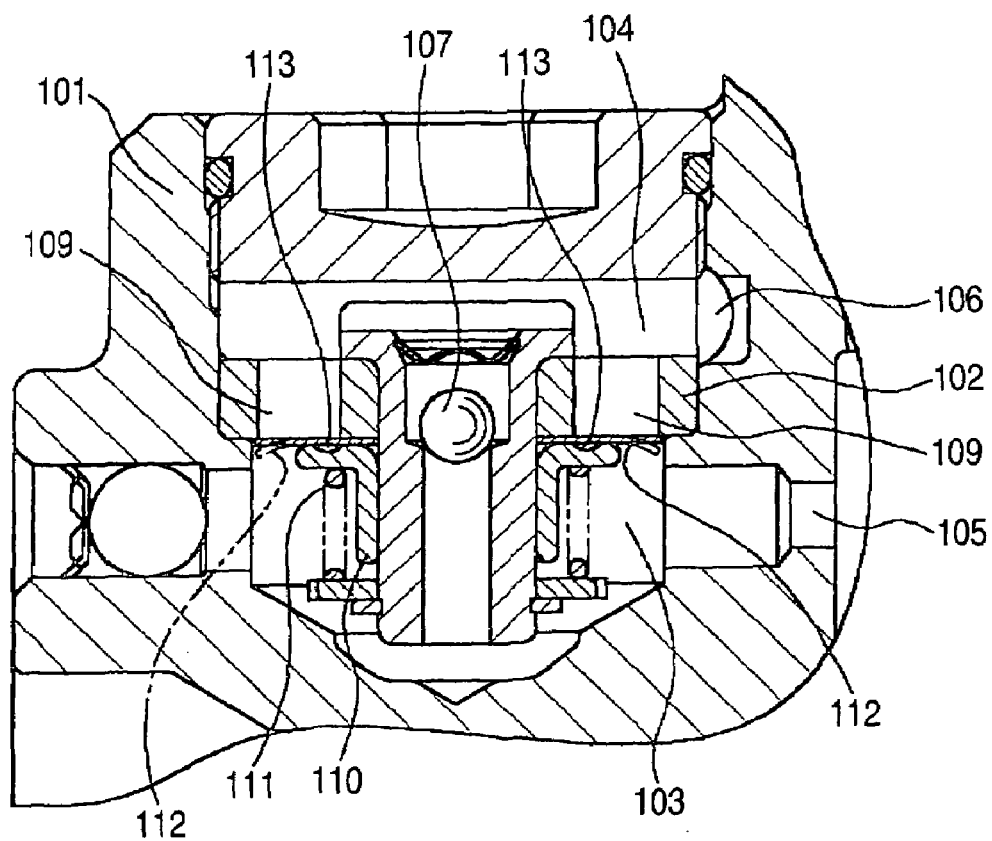
FIG. 14 is a sectional view showing a related damper valve.

FIG. 13 shows a modification of the second embodiment according to the present invention.

As shown in FIG. 13, outer circumference having a predetermined width of the annular groove 23b may not be covered with the valve member 25 and be exposed. In this case, even if the valve member 25 is not be elastically deformed since the hydraulic oil returned to the first chamber C1 is in a small amount and a pressure thereof is below a predetermined value, the hydraulic oil can flow to the first chamber C1 through a gap S4 between the valve member 25 and the annular groove 23b. Therefore, ON/OFF feeling which the driver feels when the valve member 25 is elastically deformed and the hydraulic oil rapidly flows to the first chamber can be suppressed, and thereby obtaining a good steering characteristic.

The damper valve 20 should be disposed at least at a position of any one of any hydraulic circuits between the output port 8d, 8e of the hydraulic control valve 8 and the hydraulic cylinder 6, such as interior of the first output port 8d and the second output port Se of the hydraulic control valve a.

What is claimed is:

1. A damper valve comprising:
   a hollow casing including a first port connected to a hydraulic pump side and a second port connected to a hydraulic actuator side;
   a valve sleeve which divides the casing into a first chamber communicating with the first port and a second chamber communicating with the second port and includes a plurality of communicating passages communicating the first chamber with the second chamber;
   a spool relatively movable with respect to the valve sleeve in an axial direction provided at the first chamber;
   a spring for urging the spool toward the second chamber;
   a supply port for supplying hydraulic oil, supplied to the first chamber through the first port, to the second chamber through the spool and the valve sleeve;
   a one-way valve provided in the supply port for allowing the hydraulic oil to flow from the first port to the second port and inhibiting the hydraulic oil from flowing from the second port to the first port;
   a reflux passage which leads the hydraulic oil from the second chamber to the first chamber through the plurality of communicating passages; and
   a valve member defining a gap between an outer circumference of the valve member and said valve sleeve, said valve member also for covering openings of the communicating passages which face the first chamber, wherein the valve member is elastically deformed by a low flow rate of the hydraulic oil flowing from the second chamber to the first chamber and when a flow rate of the hydraulic oil flowing from the second chamber to the first chamber exceeds a predetermined value, the valve member is moved with the spool against urging force of the spring to widely open the openings of the communicating passages.

2. The damper valve according to claim 1, wherein the valve member comprises an annular member surrounding the spool, and an inner circumference of the annular member is held between the valve sleeve and the spool.

3. The damper valve according to claim 2, wherein said gap is also formed between an outer circumference portion of the valve member and the openings of the communicating passages.

4. The damper valve according to claim 3, wherein an annular projection to which the valve member is abutted is formed at an end surface of the valve sleeve to form the gap.

5. The damper valve according to claim 3, further comprising a shim interposed between the valve member and an end surface of the valve sleeve to form the gap.

6. The damper valve according to claim 3, wherein the valve member includes a step portion to form the gap.

7. A damper valve comprising:
a hollow casing including a first port connected to a hydraulic pump side and a second port connected to a hydraulic actuator side;
a valve sleeve which divides the casing into a first chamber communicating with the first port and a second chamber communicating with the second port and includes a plurality of communicating passages communicating the first chamber with the second chamber;
a spool relatively movable with respect to the valve sleeve in an axial direction provided at the first chamber;
a spring for urging the spool toward the second chamber;
a supply port for supplying hydraulic oil, supplied to the first chamber through the first port, to the second chamber through the spool and the valve sleeve;
a one-way valve provided in the supply port for allowing the hydraulic oil to flow from the first port to the second port and inhibiting the hydraulic oil from flowing from the second port to the first port;
a reflux passage which leads the hydraulic oil from the second chamber to the first chamber through the plurality of communicating passages; and
a valve member for covering openings of the communicating passages which face the first chamber, wherein the valve member is elastically deformed by a low flow rate of the hydraulic oil flowing from the second chamber to the first chamber and when a flow rate of the hydraulic oil flowing from the second chamber to the first chamber exceeds a predetermined value, the valve member is moved with the spool against urging force of the spring to widely open the openings of the communicating passages,
wherein the valve member comprises an annular member surrounding the spool, and an inner circumference of the annular member is held between the valve sleeve and the spool, and
wherein an end surface of the valve sleeve which faces the valve member is formed with an annular groove communicating with the openings of the communicating passages.

8. The damper valve according to claim 7, wherein a gap is formed between an outer circumference portion of the valve member and a bottom surface of the annular groove.

9. The damper valve according to claim 7, wherein an outer circumference portion of the valve member contacts with the valve sleeve to close the openings of the communicating passages.

10. The damper valve according to claim 1, wherein the damper valve is provided in a predetermined hydraulic circuit disposed between an output port of the hydraulic control valve and the hydraulic actuator.

11. A damper valve, comprising:
a casing including a first port, a second port, and a valve sleeve dividing the casing into a first chamber communicating with the first port and a second chamber communicating with the second port and including a plurality of passages communicating with the first chamber and the second chamber;
a spool in the first chamber and axially moveable with respect to the valve sleeve;
a spring biasing the spool towards said second chamber;
a one-way valve allowing flow from the first port to the second port and blocking flow from the second port to the first port; and
a valve defining a gap between said casing and an outer circumference of said valve when a pressure differential across said valve is zero, the gap being defined by the casing, the valve sleeve, and the valve,
wherein oil from the second port can flow to the first port through the second chamber, the gap, and the first chamber in this order.

12. The valve of claim 11, wherein an inner circumference of said valve abuts an annular projection of said valve sleeve.

13. The valve of claim 11, wherein said valve comprises a step portion.

14. The valve of claim 11, wherein said casing father comprises an annular projection on an inner circumference of said casing and wherein said valve defines said a gap between said outer circumference of said valve and said annular projection.

15. The valve of claim 11, wherein said valve surrounds said spool.

16. The valve of claim 11, further comprising a shim between said valve and said casing.

17. A damper valve, comprising:
a casing including a first port, a second port, and a valve sleeve dividing the casing into a first chamber communicating with the first port and a second chamber communicating with the second port,
wherein said valve sleeve defines:
a plurality of passages communicating with the first chamber and the second chamber; and
an annular groove communicating with an a opening in each of said plurality of passages; and
a spool in the first chamber and axially moveable with respect to the valve sleeve;
a spring biasing the spool towards said second chamber;
a one-way valve allowing flow from the first port to the second port and inhibiting flow from the second port to the first port; and
a valve having an outer circumference contacting said valve sleeve adjacent to said annular groove.

18. The valve of claim 17, wherein said valve defines a gap between said valve sleeve adjacent to said annular groove and an outer circumference of said valve.

19. The valve of claim 17, wherein said valve surrounds said spool.

20. The valve of claim 17, further comprising a shim between said valve and said valve sleeve.

21. The valve of claim 11, wherein said valve comprises a step-shaped portion.

* * * * *